United States Patent
Martinello et al.

(10) Patent No.: US 10,599,947 B2
(45) Date of Patent: Mar. 24, 2020

(54) ON-DEMAND VISUAL ANALYSIS FOCALIZED ON SALIENT EVENTS

(71) Applicants: Manuel Martinello, Mountain View, CA (US); Hector H. Gonzalez-Banos, Mountain View, CA (US)

(72) Inventors: Manuel Martinello, Mountain View, CA (US); Hector H. Gonzalez-Banos, Mountain View, CA (US)

(73) Assignee: Ricoh Co., Ltd., Tokyo (JP)

(*) Notice: Subject to any disclaimer, the term of this patent is extended or adjusted under 35 U.S.C. 154(b) by 144 days.

(21) Appl. No.: 15/917,173

(22) Filed: Mar. 9, 2018

(65) Prior Publication Data
US 2019/0279024 A1    Sep. 12, 2019

(51) Int. Cl.
| | | |
|---|---|---|
| G06K 9/46 | (2006.01) |
| G06T 7/593 | (2017.01) |
| G06T 7/20 | (2017.01) |
| G06K 9/00 | (2006.01) |
| G06F 16/732 | (2019.01) |

(52) U.S. Cl.
CPC ....... *G06K 9/4671* (2013.01); *G06F 16/7335* (2019.01); *G06K 9/00711* (2013.01); *G06K 9/4619* (2013.01); *G06T 7/20* (2013.01); *G06T 7/593* (2017.01); *G06K 9/00771* (2013.01); *G06K 2009/00738* (2013.01); *G06T 2207/30232* (2013.01)

(58) Field of Classification Search
CPC ............ G06K 9/4671; G06K 9/4619; G06K 9/00771; G06K 9/00711; G06K 2009/00738; G06T 7/20; G06T 7/593; G06T 2207/30232; G08B 13/194; G06F 16/7335

See application file for complete search history.

(56) References Cited

U.S. PATENT DOCUMENTS

| | | |
|---|---|---|
| 9,367,733 B2 | 6/2016 | Zhu et al. |
| 9,639,747 B2 | 5/2017 | Zhu et al. |
| 2006/0239645 A1 | 10/2006 | Curtner et al. |

(Continued)

FOREIGN PATENT DOCUMENTS

| | | |
|---|---|---|
| WO | 2017114846 A1 | 7/2017 |
| WO | 2017122119 A1 | 7/2017 |

OTHER PUBLICATIONS

Iosifidis et al., "Human Action Recognition in Stereoscopic Videos Based on Bag of Features and Disparity Pyraminds," 2014 22nd European Signal Processing Conference (EUSIPCO), EURASIP, Sep. 1, 2014, pp. 1317-1321.

(Continued)

*Primary Examiner* — Jon Chang
(74) *Attorney, Agent, or Firm* — Patent Law Works LLP

(57) ABSTRACT

The disclosure includes a system and method for providing visual analysis focalized on a salient event. A video processing application receives a data stream from a capture device, determines an area of interest over an imaging area of the capture device, detects a salient event from the data stream, determines whether a location of the detected salient event is within the area of interest, and in response to the location of the salient event being within the area of interest, identifies a portion of the data stream, based on the salient event, on which to perform an action.

20 Claims, 8 Drawing Sheets

(56) References Cited

U.S. PATENT DOCUMENTS

2009/0219387 A1* 9/2009 Marman .......... G08B 13/19652
348/143
2014/0139633 A1 5/2014 Wang et al.
2014/0210978 A1* 7/2014 Gunaratne ......... G06K 9/00604
348/77

OTHER PUBLICATIONS

Popa et al., "Semantic assessment of shopping behavior using trajectories, shopping related actions, and context information," Pattern Recognition Letters, Elsevier, Amsterdam, NL, vol. 34, No. 7, May 3, 2012, pp. 809-819.

* cited by examiner

ON-DEMAND VISUAL ANALYSIS FOCALIZED ON SALIENT EVENTS

BACKGROUND

1. Field of the Invention

The specification generally relates to processing a video stream. In particular, the specification relates to a system and method for providing visual analysis focalized on a salient event.

2. Description of the Background Art

Edge computing and cloud computing are used in the current visual analytics framework of many businesses. However, this framework has some issues. First, visual analytics tasks are usually unevenly spread on the edge side (local) and the cloud side, i.e., either more visual analytics tasks are processed on the edge side (e.g., edge-heavy deployment) or more visual analytics tasks are processed on the cloud side (e.g., cloud-heavy deployment). Such deployments always have some advantages as well as some disadvantages. For example, with an edge-heavy deployment, the usage of bandwidth is low, the latencies are short, and sensitive visual data remains on site. However, edge modules are either more expensive or application-specific, commodity hardware is hard to leverage, and the business logic is difficult to change.

The data structure also plays an important role in the visual analytics. If the visual data is organized following a data model, it may allow an efficient search. However, every time the business logic changes, the data model needs to be re-defined and consequently the visual data is re-processed. On the other hand, if the visual data is in the simple, flat form of the original video, the search for such data will be inefficient, but since the data is decoupled from the business logic, little or no schema change is needed. In addition, high computing performance may correspond to high cost and hard reprograming.

SUMMARY

The techniques introduced herein overcome the deficiencies and limitations of the prior art, at least in part, with a system and method for providing visual analysis focalized on a salient event. In one embodiment, the system includes one or more processors and a memory storing instructions, which when executed cause the one or more processors to receive a data stream from a capture device. The instructions further cause the one or more processors to determine an area of interest over an imaging area of the capture device, detect a salient event from the data stream, determine whether a location of the detected salient event is within the area of interest, and, in response to the location of the salient event being within the area of interest, identify a portion of the data stream, based on the salient event, on which to perform an action.

Other aspects include corresponding methods, systems, apparatuses, and computer program products for these and other innovative aspects.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

Figure 1:
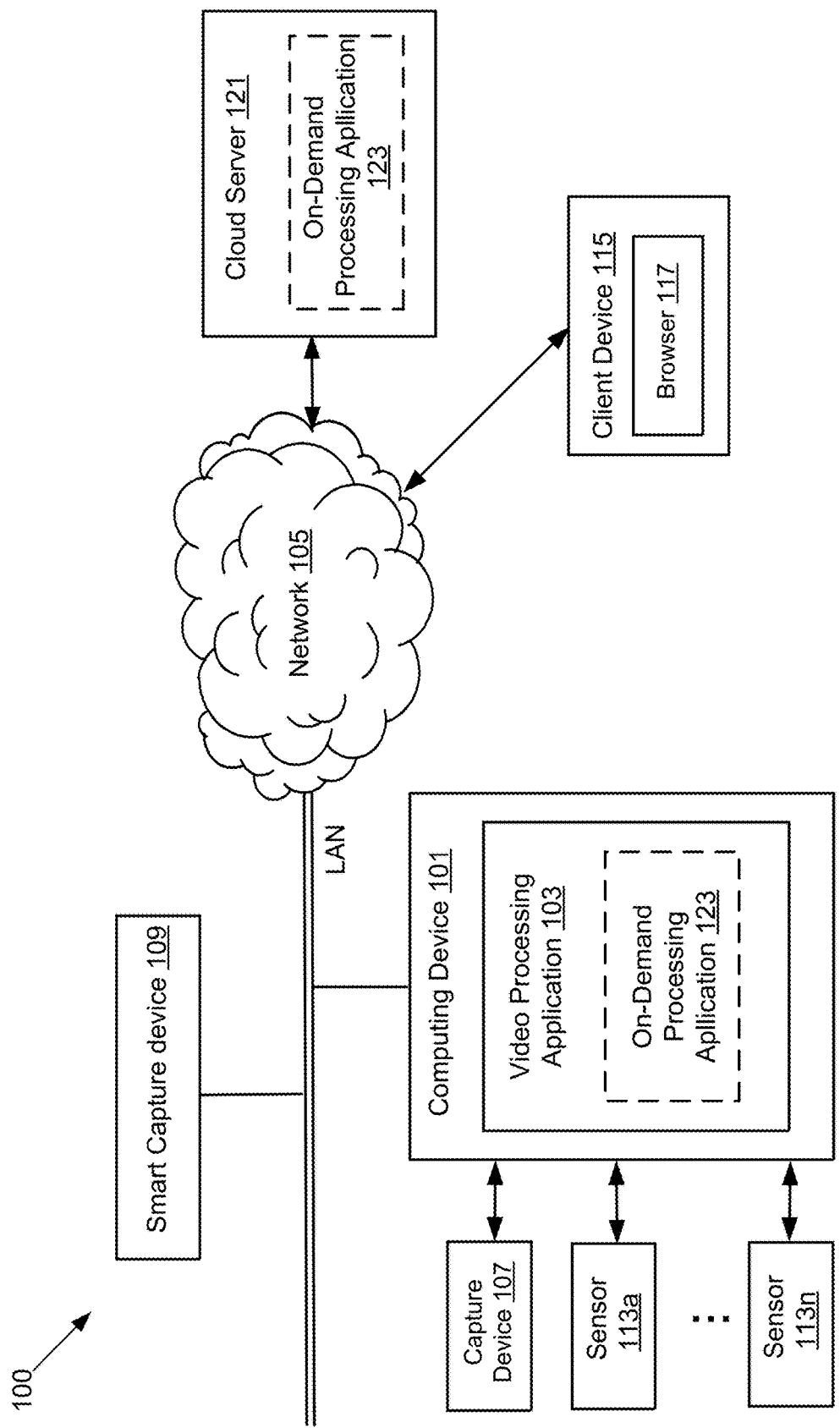
FIG. 1 depicts a high-level block diagram illustrating an example embodiment of a system for providing visual analysis focalized on a salient event.

FIG. 1 depicts a high-level block diagram illustrating an example embodiment of a system 100 for providing visual analysis focalized on a salient event. Cameras associated with most conventional video analytics systems capture information all the time. This information is either stored locally (therefore occupying a large amount of memory) or sent to the end point through a network (e.g., internet or Wi-Fi) connection (consuming a large amount of bandwidth). The amount of data generated by these cameras is increasing drastically with the improvement of their resolution. More recently, additional sensors, such as depth sensors and thermal sensors, are used in addition to or in place of conventional cameras. These sensors not only collect information all the time, but also require more computationally expensive post-processing than the conventional cameras collecting color (RGB) and/or near-infrared (IR) information.

However, since there is nothing of interest happening most of the time, sensors and processes that are active and running at all times waste storage, resources, and electrical and computational power. The proposed framework described herein can drastically reduce the amount of memory and power needed, and therefore the cost of the whole system.

The illustrated system 100 includes a computing device 101, a capture device 107, a smart capture device 109, sensors 113*a* . . . 113*n*, a client device 115, and a cloud server 121. In the illustrated embodiment, the computing device 101, the capture device 107, the smart capture device 109, and the sensors 113*a* . . . 113*n* are connected in a local area network (LAN) and are further communicatively coupled to other entities of the system 100 via a network 105. Although definite numbers of capture devices, sensors, computing devices, smart capture devices, client devices, and video servers are shown in FIG. 1, it should be understood that there may be any number of such entities. Also, such entities can be connected by any number of networks and/or LANs. Further, in FIG. 1 and the remaining figures, a letter after a reference number, e.g., "113a," represents a reference to the element having that particular reference number. A reference number in the text without a following letter, e.g., "113," represents a general reference to instances of the element bearing that reference number.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 may include Bluetooth communication networks or a cellular communications network for sending and receiving data including short messaging service (SMS), multimedia messaging service (MMS), hypertext transfer protocol (HTTP), direct data connection, WAP, email, etc.

The client device 115 is a computing device including a processor, a memory, applications, a database, and network communication capabilities. For example, the client device 115 can be a laptop computer, a desktop computer, a tablet computer, a mobile telephone, a personal digital assistant (PDA), a mobile email device, a television with one or more processors embedded therein or coupled thereto or any other electronic device capable of accessing the network 105 and communicating with the cloud server 121, the capture device 107, the smart capture device 109, a sensor 113, or the computing device 101. In some embodiments, the client device 115 communicates with other entities of system 100 via the network 105 for providing functionality described herein. For example, the client device 115 sends a request for video content. Responsive to the request, the computing device 101 provides the video content to the client device 115.

In some embodiments, the client device 115 includes a browser 117. The browser 117 is an application running on the client device 115 that locates, retrieves, and displays content for a user accessing the client device 115. For example, the browser 117 may communicate with the computing device 101 to pull the video content using HTTP GET requests from the cloud server 121 for displaying to a user in response to the user's video content request.

The cloud server 121 may be either a hardware server, a software server, or a combination of software and hardware. The cloud server 121 may be, or may be implemented by, a computing device including a processor, a memory, applications, a database, and network communication capabilities. The cloud server 121 communicates with other entities of the system 100 via the network 105 to perform the functionality described herein. In some embodiments, the cloud server 121 receives an output from an on-demand video processing operation and runs one or more tasks. The on-demand video processing operations may include optical flow analysis, stereo analysis, and other video analytics. In some embodiments, the cloud server 121 communicates with the computing device 101 to receive an output of the on-demand video processing operations from the computing device 101. In other embodiments, the cloud server 121 optionally includes an on-demand processing application 123 to implement the on-demand video processing operations. The optional on-demand processing application 123 depicted in dashed lines will be described below in more detail. Based on the output (e.g., a disparity map, a depth map) of the on-demand processing, the cloud server 121 runs one or more tasks. A task may include, but is not limited to, people counting, people flow, face detection, person tracking, perimeter intrusion detection, vicinity detection, fall detection, etc.

The capture device 107 is a hardware device that captures video and associates metadata with the video. For example, the capture device 107 can be a digital video camera, a web cam, an IP camera, etc. The video captured by the capture device 107 can be any series of time-related images. The capture device 107 associates metadata with the video, for example, a time and a location at which the video was captured, an image size, an image resolution, color depth, a frame rate, etc. In a preferred embodiment, the capture device 107 is a low-cost camera that consumes few resources and is durable. In some embodiments, capture device 107 may be a thermal capture device or camera (i.e., far IR) instead of a conventional camera.

The smart capture device 109 is a capture device similar to capture device 107 that is also capable of invoking applications, running software programs, or performing other analytics logic. For example, a smart capture device 109 may run a video processing application to perform image recognition on the captured video. In some embodiments, the smart capture device 109 performs the video processing functions of the computing device 101 running video processing application 103, described below.

The sensor 113 is a hardware device that detects and responds to input from a physical environment. The sensor 113 is coupled to the LAN and/or the network 105 to provide information or signals about the physical environment. Although it is not shown in FIG. 1, a single sensor, a series of sensors, or a grid or array of sensors may be located in different LANs and coupled to the network 105. The sensor(s) can be a beacon for detecting the location and orientation of a user. For example, the sensor(s) may be a global positioning system (GPS) sensor, a Wi-Fi sensor, a micro electro mechanical system (MEMS) sensor, a Bluetooth beacon such as a Bluetooth low energy (BLE) beacon, an ultrasonic beacon, a depth sensor, a video camera, a sensor using cellular positioning, near field communications, video location, and other positioning techniques. Other types of sensors may be used, for example, a motion sensor such as a gyroscope, a proximity sensor, a radio frequency (RF) detector, an accelerometer, an ambient light sensor, a thermal sensor, a biometric sensor, etc.

The computing device 101 is a hardware device/server that performs video analytics on a data stream (e.g., a video). In some embodiments, the computing device 101 connects with the capture device 107 to receive a video stream for performing video analytics. In other embodiments, the computing device 101 also connects with the sensor to receive an additional data stream or other sensor information such as luminance information, temperature information, etc., to enhance the video analytics. The computing device 101 receives an input data stream from one or more of the attached capture device 107 and sensor 113, and generates output video content, e.g., a highly compressed video portion, based on processing the input data stream. The computing device 101 also generate a video analytic result, e.g., a displacement map, a disparity map, a depth map, as described below.

In some embodiments, the computing device 101 is capable of invoking applications and running software programs to perform video analytics relating to content management, deployment management, etc. For example, the computing device 101 may use an application to manage the video content based on identification, correlations, aggregations, filtering, and sampling, etc. The computing device 101 may identify features from the video stream, recognize objects from the video stream based on the features, and select a portion of the video stream that can be used for an advanced video operation (e.g., on-demand processing). The computing device 101 may also run an enhancer program to improve the quality of the video stream.

In some embodiments, the computing device 101 includes a video processing application 103. In some embodiments, the video processing application 103 can be implemented using programmable or specialized hardware. In some embodiments, the video processing application 103 can be implemented using a combination of hardware and software. In other embodiments, the video processing application 103 may be software stored and executed on the computing device 101.

The video processing application 103 receives a video from a main sensor (preferably a low-cost capture device). The video processing application 103 determines an area of interest (AOI) over an imaging area of a main sensor. For example, the video processing application 103 determines an area, from the image field of the main sensor, that is of interest to a user. The area of interest may be, for example, a dangerous area, a crowded area, a sterile area, etc. In some embodiments, the area of interest is defined in the form of polygon(s) and/or line(s). For example, the area of interest may be a line, or series of lines, that define a fence over which motion is monitored.

The video processing application 103 performs saliency detection on the received data stream, e.g., the video. In some embodiments, the video processing application 103 determines saliency of an object, extracts a salient object from the data stream based on the saliency, and identifies an event including a salient object as a salient event. For example, the video processing application 103 detects movement of an object, appearance of an object, disappearance of an object, a change of illumination, etc., to determine a salient object and an associated salient event. In some embodiments, the video processing application 103 may determine the salient event based on object movement as well as other characteristics of the video such as color, shape, contrast, etc.

In some embodiments, for example, when the capture device 107 is a thermal camera, the video processing application 103 may detect saliency based on motion, appearance, and disappearance of subjects with a temperature different than the background (e.g., a human, an animal, or a cold drink in a room). Additionally, the video processing application 103 may determine saliency and sudden temperature changes in the captured scene.

Once a salient event is determined, the video processing application 103 determines whether a location of the salient event is within the area of interest. If the location of the salient event is within the area of interest, the video processing application 103 identifies a portion of the data stream based on the location and the time of occurrence of the salient event and forwards the identified portion to an on-demand processing application 123 for further video analytics, such as optical flow analysis or depth estimation. In some embodiments, the video processing application 103 also triggers an additional sensor to provide supplemental data that may be used for further video analytics.

In some embodiments, the computing device 101 and/or the cloud server 121 includes an on-demand processing application 123. The on-demand processing application 123 performs complex video analysis such as optical-flow analysis, stereo analysis, etc., on the portion of the data stream received from the video processing application 103. In some embodiments, the on-demand processing application 123 also performs video compression on the portion of the data stream to lower the data size. The on-demand processing application 123 transmits the compressed data along with the output of the analysis to an endpoint, e.g., a local server or the cloud server 121, where a final task may be conducted. For example, the cloud server 121 may count how many people enter and/or leave an area of interest based on the data received from the on-demand processing application 123. The operation of the video processing application 103 and the on-demand processing application 123, and the functions listed above are described below in more detail with reference to FIGS. 2-7.

The techniques described herein provide an efficient video analytics framework that achieves tradeoff between edge footprint and bandwidth cost, and balances between device performance and versatility. The techniques described herein are advantageous in many aspects. First, hardware "at the edge" is reduced because expensive processes are merely implemented when needed, i.e., on demand. For example, a complex optical flow analysis is performed only if a salient event is motion-related. Second, the use of expensive sensors is reduced. Typically, a low-cost camera is active and running long hours to provide a video feed. Only when something interesting is detected (i.e., a salient event), an additional sensor is activated to feed supplemental information. Third, the framework introduces an area of interest for saliency detection to reduce false alarms. In other words, an intrusion event occurring within an area of interest of a surveillance video will trigger an alarm (e.g., an alarm for further video processing operations) while the intrusion event detected outside any area of interest will not trigger an alarm. Fourth, the data transmitted to an endpoint is reduced. The data is not stored until specific conditions are met, for example, a portion of data stream including a salient event, rather than the entire data stream, is stored and used for on-demand video processing. Also, highly-compressed data is transmitted to the endpoint. The video analytics framework described herein therefore dramatically reduces network and computation costs. As a result, it becomes affordable to have multiple units to cover a larger working area, for example, including units performing people counting, fall detecting, people flow, etc. In addition, linked units performing people counting may be combined to produce people flow, which further reduces costs.

Figure 2:
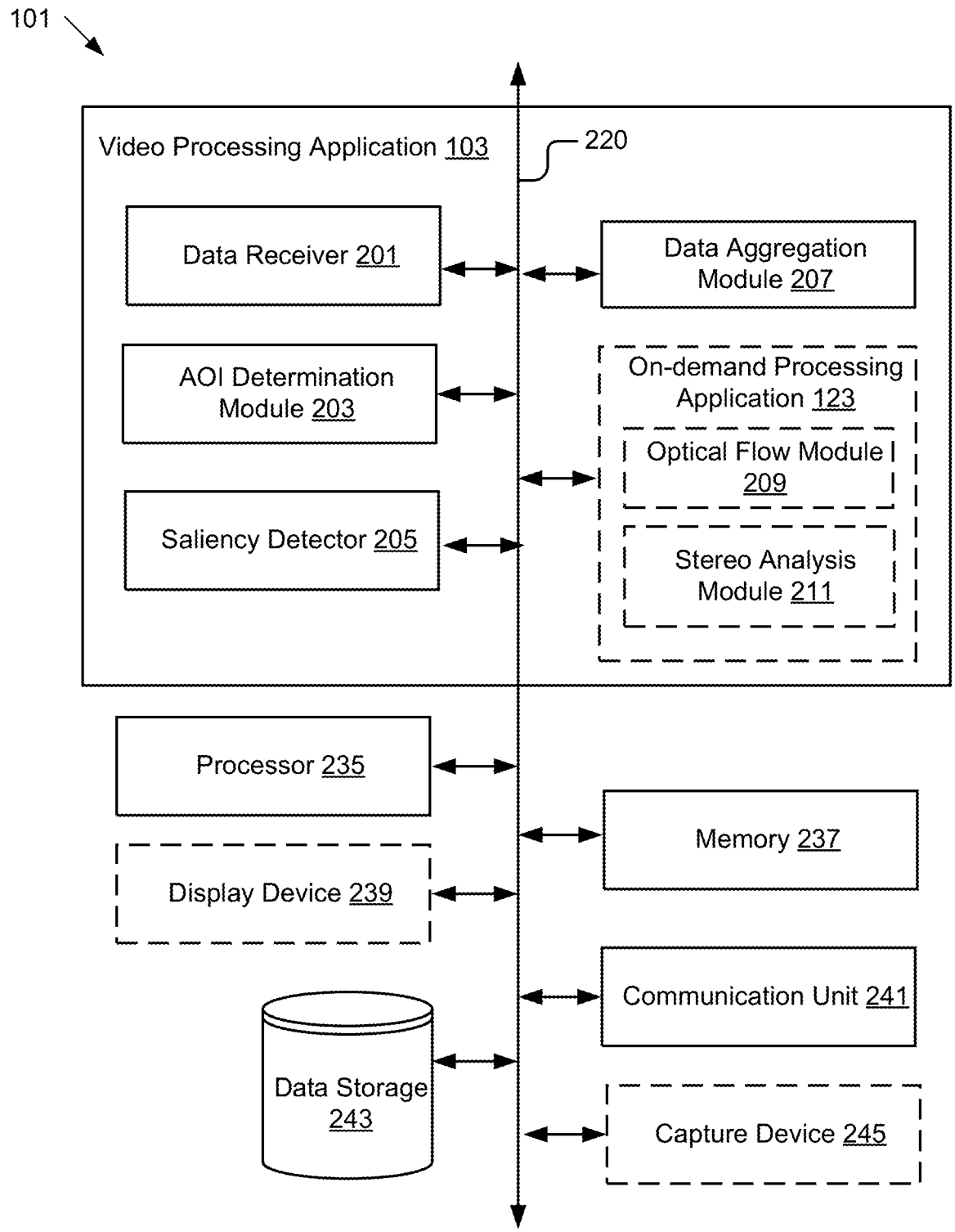
FIG. 2 depicts a block diagram illustrating an example embodiment of a connect box including a video processing application.

FIG. 2 depicts a block diagram illustrating one embodiment of a computing device 101 including a video processing application 103. The computing device 101 may also include a processor 235, a memory 237, an optional display device 239 and capture device 245, a communication unit 241, and data storage 243 according to some examples. The components of the computing device 101 are communicatively coupled to a bus 220 for communication with each other.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, and/or an architecture implementing a combination of instruction sets. The processor 235 may be physical and/or virtual and may include a single processing unit or a plurality of processing units and/or cores. In some implementations, the processor 235 may be capable of generating and providing electronic display signals to a display device, supporting the display of user interfaces used in receiving a user request for video content, identifying and providing the requested video content to a user, etc. In some implementations, the processor 235 may be coupled to the memory 3 via the bus 220 to access data and instructions therefrom and store data therein. The bus 220 may couple the processor 235 to the other components of the computing device 101 including, for example, the memory 237, the communication unit 241, the video processing application 103, and the data storage 243. It will be apparent to one skilled in the art that other processors, operating systems, and physical configurations are possible.

The memory 237 may store and provide access to data for the other components of the computing device 101. In some implementations, the memory 237 may store instr and/or data that may be executed by the processor 235. The instructions and/or data may include code for performing the techniques described herein. For example, in one embodiment, the memory 237 may store the video processing application 103. The memory 237 is also capable of storing other instructions and data, including, for example, an operating system, hardware drivers, other software applications, databases, etc. The memory 237 may be coupled to the bus 220 for communication with the processor 235 and the other components of the computing device 101.

The memory 237 may include one or more non-transitory computer-usable (e.g., readable, writeable) device, a dynamic random access memory (DRAM) device, a static random access memory (SRAM) device, an embedded memory device, a discrete memory device (e.g., a PROM, FPROM, ROM), a hard disk drive, an optical disk drive (CD, DVD, Blu-ray™, etc.) mediums, which can be any tangible apparatus or device that can contain, store, communicate, or transport instructions, data, computer programs, software, code, routines, etc., for processing by or in connection with the processor 235. In some implementations, the memory 237 may include one or more of volatile memory and non-volatile memory. It should be understood that the memory 237 may be a single device or may include multiple types of devices and configurations.

The display device 239 is a liquid crystal display (LCD), light emitting diode (LED) or any other similarly equipped display device, screen or monitor. The display device 239 represents any device equipped to display user interfaces, electronic images and data as described herein. In different embodiments, the display is binary (only two different values for pixels), monochrome (multiple shades of one color), or allows multiple colors and shades. The display device 239 is coupled to the bus 220 for communication with the processor 235 and the other components of the computing device 101. It should be noted that the display device 239 is shown in FIG. 2 with dashed lines to indicate it is optional. For example, the computing device 101 may be a server for performing video content analysis without a display device 239 or a smart capture device without a display.

The communication unit 241 is hardware for receiving and transmitting data by linking the processor 235 to the network 105 and other processing systems. The communication unit 241 receives data for processing. For example, the communication unit receives video data from the capture device 107 for processing by the video processing application 103. The communication unit 241 may also transmit information to a client device 115 for display. For example, the communication unit 241 receives a request for video content from a user of the client device 115 and transmits the video content to the client device 115 via the cloud server 121. The communication unit 241 is coupled to the bus 220. In one embodiment, the communication unit 241 may include a port for direct physical connection to the network 105. In another embodiment, the communication unit 241 may include a wireless transceiver (not shown) for exchanging data with the client device 115 or any other communication channel using one or more wireless communication methods, such as IEEE 802.11, IEEE 802.16, Bluetooth®, cellular communications, or another suitable wireless communication method.

The data storage 243 is a non-transitory memory that stores data for providing the functionality described herein. In the illustrated embodiment, the data storage 243 is communicatively coupled to the bus 220 to receive data for storage and provide data for retrieval upon a request for the data. The data storage 243 may store a video, a set of rules used to define area(s) of interest, the area(s) of interest, saliency attributes, a displacement map, a disparity map, a depth map, etc.

The capture device 245 is a hardware device that captures video and associates metadata with the video. For example, the capture device 245 can be a digital video camera, a web cam, an IP camera, etc. The video captured by the capture device 245 can be any series of time-related images. The capture device 245 associates metadata with the video, for example, a time and a location at which the video was captured, an image size, an image resolution, color depth, a frame rate, etc. The capture device 245 is coupled to the bus 220 for communication with the processor 235 and the other components of the computing device 101. It should be noted that the capture device 245 is shown in FIG. 2 with dashed lines to indicate it is optional. For example, the computing device 101 may be a server for performing video content analysis connected to a remote capture device 107 or a smart capture device 109 that includes an integrated capture device 245.

In some embodiments, the video processing application 103 includes a data receiver 201, an AOI determination module 203, a saliency detector 205, a data aggregation module 207, and an optional on-demand processing application 123.

The components of the video processing application 103 may include software and/or logic to provide the functionality they perform. In some embodiments, the components can be implemented using programmable or specialized hardware including a field-programmable gate array (FPGA) or an application-specific integrated circuit (ASIC). In some embodiments, the components can be implemented using a combination of hardware and software executable by processor 235. In some embodiments, the components are instructions executable by the processor 235. In some implementations, the components are stored in the memory 237 and are accessible and executable by the processor 235.

The data receiver 201 may include software and/or logic to provide the functionality for receiving data and storing the data in a buffer. In some embodiments, the data receiver 201 receives a video stream from the capture device 107. The capture device 107 may be a low-cost, low-resolution camera that works all the time, and thus considered as a "main sensor." The main sensor captures videos/images of the scene and acts as a main data source. In other embodiments, the data receiver 201 also receives data from an additional sensor. The additional sensor may be a smart capture device, an infrared sensor, a depth sensor, a video camera, an accelerometer, an ambient light sensor, a thermal sensor, a biometric sensor, etc. The additional sensor may be activated under a certain condition as described below with reference with the saliency detector 205. Based on various types of sensors, the data received by the data receiver 201 may include luminance measurements, chrominance measurements and other types of measurements. The data receiver 201 buffers the received data until the saliency detector 205 or the data aggregation module 207 is able to process the data. A person skilled in the art will recognize that any number of main sensors and/or additional sensors is possible.

The AOI determination module 203 may include software and/or logic to provide the functionality for determining an area of interest over an imaging area of a main sensor, for example, the capture device 107.

The imaging area is a two-dimensional field of view showing part of the world that is visible through the main sensor located at a particular position and a particular orientation. An area of interest is a portion of the imaging area that is of interest to a user, for example, an entrance area, a crowded area, etc. In some embodiments, the area of interest may be the entire two-dimensional imaging area captured by the main sensor.

In some embodiments, the AOI determination module 203 determines an area of interest based on a set of rules. The set of rules may be set up based on locations (e.g., a hospital, a store), area functions (e.g., a study area, an entertainment area), user preferences, etc. According to an example rule, the entrance and the exit of a building may be areas of interest because video/image data of these areas can be used to determine a number of people entering the building, a number of people leaving the building, at what time a maximum number of people are in the building, etc. In another example, a company office may be an area of interest, a particular hospital corridor is an area of interest as requested by a user, etc. In some embodiments, the AOI determination module 203 receives a set of predetermined rules designed by the system. In other embodiments, the AOI determination module 203 includes a user interface module (not shown) to generate one or more user interfaces to receive a user selection of a predetermined rule, accept a user input for modifying a predetermined rule, receive a user-defined rule, or receive a user preference regarding an area of interest, etc. The AOI determination module 203 adjusts an area of interest to adapt to the change of the rules and/or the user preferences. For example, the AOI determination module 203 removes an area of interest when the area is no longer crowded. The area(s) of interest is therefore dynamic.

In other embodiments, the AOI determination module 203 collects data captured previously from a same (or similar) sensor that is placed in the same (or very similar) position as a main sensor, and automatically learns an area of interest for the main senor from the collected data using a machine learning algorithm. For example, suppose a first classroom and a second classroom of a school have the same capture devices installed at a same position of each classroom. If an area of interest has been determined for the first classroom, the AOI determination module 203 can automatically learn an area of interest for the second classroom from the data of the first classroom.

The AOI determination module 203 defines an area of interest in the form of polygon(s) and/or line(s). In some embodiments, the AOI determination module 203 determines an area inside one or multiple polygons to be the area of interest. In other embodiments, the AOI determination module 203 determines an area outside one or multiple polygons to be the area of interest. In some other embodiments, the AOI determination module 203 determines one or multiple lines to be the area of interest. The one or multiple lines may or may not be connected. The area of interest defined by line(s) may also be referred to as fence. A person skilled in the art should recognize that any number of areas of interest can be determined, and an area of interest can be any combination of an inside-polygon, an outside-polygon, and a line. A person skilled in the art should also recognize that other shapes or other techniques can be used to define and determine an area of interest.

Figure 3:
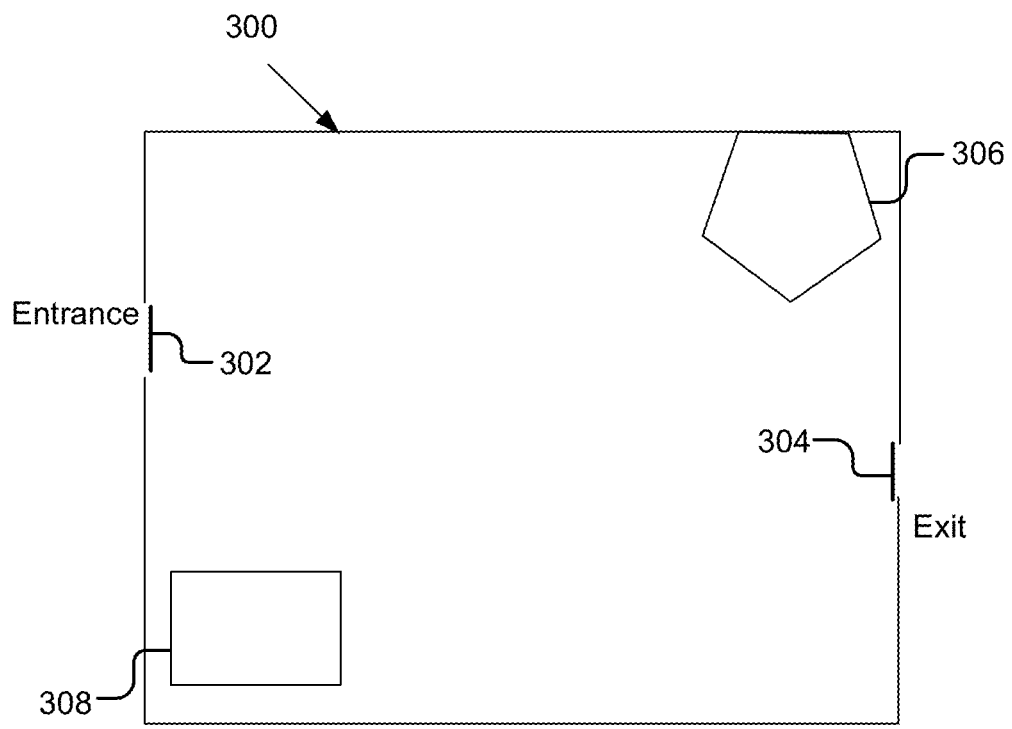
FIG. 3 depicts a graphical representation of example areas of interests.

FIG. 3 depicts a graphical representation of example areas of interest. The imaging area 300 may be from a main sensor. The AOI determination module 203 defines the entrance with a first line 302 and defines the exit with a second line 304. The AOI determination module 203 identifies lines 302 and 304 as areas of interest. The AOI determination module 203 also defines two other areas of interest in the form of polygons 306 and 308. As described below, only data related to these areas of interest will be analyzed, and thus reduces the computational and network resources.

The saliency detector 205 may include software and/or logic to provide the functionality for detecting a salient event from a data stream and identifying a location and a time that the salient event occurred.

In some embodiments, the saliency detector 205 receives a data stream (e.g., a video) from a main sensor (e.g., the capture device 207) via the data receiver 201. The saliency detector 205 determines a salient event based on saliency of objects in the video. The saliency represents a pronounced feature of the video. For example, if an event includes only static or slow-moving objects, e.g., a quiet street or a neon beacon of a theater that is repetitively flashing in a surveillance video, this event is non-salient. However, if an event includes a first person that is moving in a hallway, this event is a salient event. Or if a second person is moving left while other people in the video are moving right, the saliency detector 205 determines the event including the second person is a salient event. In some embodiments, the saliency detector 205 determines saliency of an object, extracts a salient object from the video stream based on the saliency, and identifies an event including a salient object as a salient event.

In some embodiments, the saliency detector 205 uses motion detection techniques, e.g., a background and foreground separation method based on motion detection, to identify a salient object associated with a salient event. For example, the saliency detector 205 may extract a foreground of the video based on object movements, identify an object in the foreground as a salient object, and include the salient object in a salient event. In another example, the saliency detector 205 determines a first salient event to include a moving object that is not in a predomination flow and determines a second salient event to include a salient object that has no vertical movement. Based on the motion detection techniques, the saliency detector 205 detects movement of an object, appearance of an object, disappearance of an object, a change of illumination, etc., to determine a salient object and associated salient event.

In some embodiments, the saliency detector 205 receives a low-resolution video from a low-cost conventional capture device (e.g., a RGB camera, an IR camera, or a monochrome camera) via the data receiver 201, and detects a salient event based on a low-resolution motion detection algorithm. Using such algorithm, the saliency detector 205 determines a salient event based on detecting changes in the scene such as movement of an object, appearance of the object, disappearance of the object, and a sudden illumination change.

In other embodiments, the saliency detector 205 may receive a video from a thermal camera (e.g., far IR) instead of from a conventional capture device. Using the same low-resolution motion detection algorithm, the saliency detector 205 may detect movement, appearance, and disappearance of an object with a temperature different from the background (e.g., a human, an animal, or a cold drink in a room), or detect a sudden temperature changes in the imaged scene. The saliency detector 205 determines a salient event based on the detected changes.

Sometimes motion detection techniques are not applicable in determining a salient object and associated salient event, for example, when there are numerous moving objects in a busy highway, a crowded store, etc. The other characteristics of the video such as color, shape, contrast, etc., may be used to determine a salient object and associated salient event. For example, the saliency detector 205 may identify a salient event including a shining point (e.g., a bright flashlight) in a surveillance video of a dark house, or identify a salient event including a person wearing a yellow safety vest, or identify a salient event including a round-shaped object.

In some embodiments, the saliency detector 205 uses the background and foreground separation based on motion detection, a Gaussian Mixture Models (GMM) based algorithm, and a visual background extractor (ViBe) to extract background and foreground of the video to determine a salient object and corresponding salient event. Other algorithms for determining a salient event of the video may include an adaptive GMM, a self-organizing map algorithm, a principal component analysis algorithm, an algorithm based on low-rank decomposition for modelling background, etc.

When determining a salient event from a data stream (e.g., a video) received from a capture device (e.g., a main sensor), the saliency detector 205 also identifies a location of the salient event and a time of occurrence of the salient event. In some embodiments, the saliency detector 205 receives an area of interest over the imaging area of the capture device determined by the AOI determination module 203 and determines whether the location of the salient event is within the area of interest. In this case, the saliency detector 205 identifies a portion of the data stream based on the location and the time of occurrence of the salient event and forwards the identified portion to an appropriate module for performing an action such as optical flow analysis or depth estimation. This greatly reduces the amount of data transmitted and processed, and thus eliminates unnecessary computation and network cost.

In some embodiments, once a salient event is determined, the saliency detector 205 also determines whether additional data is desired and signals the data aggregation module 207 to obtain more data. In some embodiments, if the additional data is from an additional visual sensor, for example, an IR camera, a depth camera, the saliency detector 205 may also identify a portion of data based on both the video received from the main sensor (e.g., the low-cost capture device), and the data from the additional more expensive visual sensor.

In some embodiments, the saliency detector 205 determines a time interval including the time of occurrence of the salient event, e.g., a time ranging from $n_1$ second(s) before the time of occurrence and $n_2$ second(s) after the time of occurrence. In some embodiments, the saliency detector 205 determines a region based on the location of the salient event, e.g., a region surrounding the salient object included in the salient event. The saliency detector 205 identifies a portion of the data stream satisfying both time restriction (i.e., the time interval) and space restriction (i.e., the region). A further video processing operation or action will be performed only on this portion of the data. For example, the saliency detector 205 determines a time interval ranging from the $12^{th}$ second to the $20^{th}$ second if the salient event occurred at the $16^{th}$ second of the video. The saliency detector 205 also determines a bounding box surrounding the salient object of the salient event and extracts pixels inside the bounding box from a subset of frames of the video. The saliency detector 205 transmits the portion of data satisfying both the time restriction (e.g., [12, 20] time interval) and the space restriction (e.g., the bounding box) to at least one of the data aggregation module 207 and the on-demand processing application.

The data aggregation module 207 may include software and/or logic to provide the functionality for aggregating data and transmits the data to the on-demand processing application 123.

The saliency detector 205 identifies a portion of data from a video captured by a main sensor, on which a further action (e.g., a depth estimation, an optical flow analysis) will be performed. In some embodiments, the saliency detector 205 determines that additional data is desired and signals the data aggregation module 207 to activate another sensor(s) in order to capture additional information of the scene. For example, the saliency detector 205 reports motion features (e.g., saliency attribute) from a low-resolution video captured by an inexpensive main sensor, and determines other environment information (e.g., temperature, luminance) may help provide additional insight on movement in the video. As a result, the saliency detector 205 notifies the data aggregation module 207 to trigger an additional sensor, for example, a thermal sensor, to obtain the additional environment information. The data aggregation module 207 identifies and activates the particular additional sensor and receives the additional information (e.g., temperature measurements) from the additional sensor.

In some embodiments, the data aggregation module 207 receives a portion of data identified by the saliency detector 205 based on a salient event. In other embodiments, the data aggregation module 207 receives additional data requested by the saliency detector 205. In some other embodiments, the data aggregation module 207 may also communicate with the data receiver 201 to capture other data from a buffer. The data aggregation module 207 aggregates the received data and passes the aggregated data to a more expensive process(es) implemented by the on-demand processing application 123.

The on-demand processing application 123 includes an optical flow analysis module 209 and a stereo analysis module 211. As shown in the example of FIG. 2, the application/modules 123, 209, and 211 are depicted with dashed lines to indicate that these application/modules are optional, meaning that 123, 209, and 211 may perform actions locally (as in the computing device 101) or in the cloud (as in the cloud server 121).

In some embodiments, each of the modules 209 and 211 receives data from the data aggregation module 207 and performs an action on the data. The received data includes a portion of data identified by the saliency detector 205 from a video of a main sensor based on a salient event. The received data may also include the additional data from an additional sensor requested by the saliency detector 205 and other data captured from a buffer via the data receiver 201.

The optical flow module 209 may include software and/or logic to provide the functionality for performing optical flow estimation on the received data. The optical flow module 209 computes motion of the pixels of a sequence of the received data, (e.g., determining where the pixels of an image at time t are in the image at time t+1), and outputs a pixel correspondence in the form of a displacement map. In some embodiments, the optical flow module 209 estimates two-dimensional image motion over sequences of time-ordered images and uses the two-dimensional motion estimation to recover the three-dimensional motion of the capture device (to within a scale factor) and the three-dimensional surface structure (shape or relative depth). In addition to estimating the three-dimensional nature and structure of the scene, as well as the 3D motion of objects and the observer relative to the scene, the optical flow module 209 also uses the optical flow on motion detection, object segmentation, time-to-collision and focus of expansion calculations, and motion compensated encoding.

The stereo analysis module 211 may include software and/or logic to provide the functionality for performing stereo analysis on the received data. In some embodiments, the stereo analysis module 211 determines the stereoscopic vision that gives two images of the same scene from different positions. The stereo analysis module 211 compares the two images and obtains the relative depth information in the form of a disparity map. The disparity map encodes the difference in coordinates of similar features within two stereo images, i.e., corresponding image points. The values in this disparity map are inversely proportional to the scene depth at the corresponding pixel location. In some embodiments, the stereo analysis module 211 also determines a depth map based on the disparity information. The depth map includes information relating to the distance of the surfaces of scene objects from a viewpoint. In some embodiments, the stereo analysis module 211 also projects the disparity map into a 3D point cloud based on projective parameters of the capture device.

As compared to the other video analysis operations conducted by the other modules of the video processing application 103, the application/modules 123, 209, and 211 performs more expensive video analysis operations/actions that require more computational resources. In addition to the optical flow analysis and stereo analysis described above, a person skilled in the art will recognize that other data analysis modules may be included in the on-demand processing application 123 and other types of data analysis may be conducted by the on-demand processing application 123 as well.

In some embodiments, the application/modules 123, 209, and 211 transmits its output, e.g., a displacement map, a disparity map and a depth map, to the cloud server 121. The cloud server 121 runs a task based on the received collection of maps. The task may be related to, for example, a people counter, people flow, face detection, tracker, perimeter intrusion, vicinity detector, fall detector, etc. For example, the cloud server 121 uses the collection of maps for counting the number of people entering and leaving the area of interest, asserting the presence of people in the area of interest, detect a person falling down in the area of interest, etc. The more detail about these tasks will be described below with reference to FIG. 5B.

Figure 4:
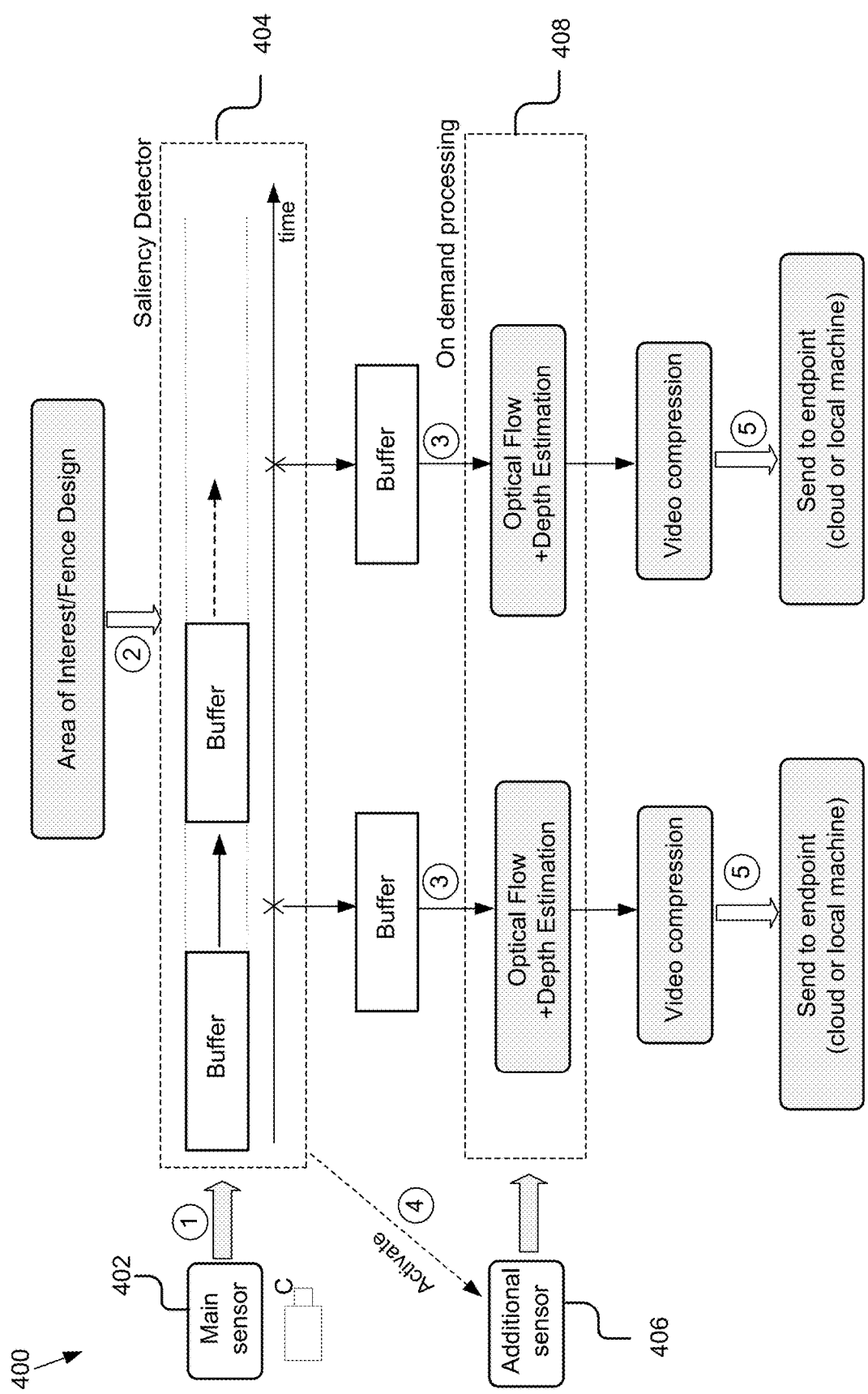
FIG. 4 depicts a block diagram illustrating an example embodiment of a framework for on-demand video processing focalized on a salient event.

FIG. 4 depicts a block diagram illustrating an example embodiment of a framework 400 for on-demand video processing focalized on a salient event. A main sensor 402 captures a video and sends this video to a buffer, which is accessible to a saliency detector of a computing device (e.g., the computing device 101 in FIG. 1). At block 404, the saliency detector receives the video from the buffer as shown in arrow 1 and performs saliency detection on the buffered video data. The saliency detector also receives information of area(s) of interest as shown in arrow 2. The saliency detector identifies a salient event based on the saliency. The saliency detector then extracts the video between a time interval including the salient event from the buffer and sends the extracted portion of the video to block 408 as shown in arrow 3, where the on-demand processing of the video is conducted.

In some embodiments, at block 404, the saliency detector also determines that information more than the received video is desired for video processing upon detecting a salient event. In this situation, an additional sensor 406 is activated as show in arrow 4 to provide more information to the saliency detector.

At block 408, responsive to receiving the extracted portion of the data as in arrow 3, a server performs on-demanding processing actions or operations such as optical flow and depth estimation. The server can be located on the edge side or cloud side depending on the system design. For example, the server may be the local computer device 101 or the cloud server 121 as depicted in FIG. 1. As compared to the video processing operations conducted in block 404, the server implements more complex video analytics operations in block 408. These complex operations are conducted on-demand to minimize the usage of computation and network resources without loss in performance. In some embodiments, the server produces an output based on the on-demand processing actions or operations in block 408, and also compresses the video data. The server sends the output and the compressed video data to the endpoint in the local or in the cloud as shown in arrow 5.

The example video analytics framework shown in FIG. 4 allows the data to be organized along saliency. The data arranged in this way is neither the original flat-organized video data nor structured data designed for efficient search. Such semi-structured data is particularly useful when applied in many different applications. Implemented as such, the schema remains constant across the many applications. For example, since motion features are critical in retail, hospitals, elderly-homes, and many other businesses servicing customers, data organized in motion saliency can be used in all these applications without any change of business schema, i.e., no specific data model is needed for these businesses. In addition, the video analytics framework shown in FIG. 4 analyzes and transmits only the data portion including a salient event, and therefore greatly reduces the network bandwidth. Also, the framework allows the business-specific analysis to be performed on the cloud side, and therefore reduces the load of the edge side. In many applications, the edge side includes simple and/cheap devices, which may lack the ability to perform expensive analysis. It is also not easy to change the business logic on the edge side (e.g., upgrading the surveillance cameras in each retail store). Therefore, eliminating the edge side from business-specific analysis is advantageous.

Figure 5A:
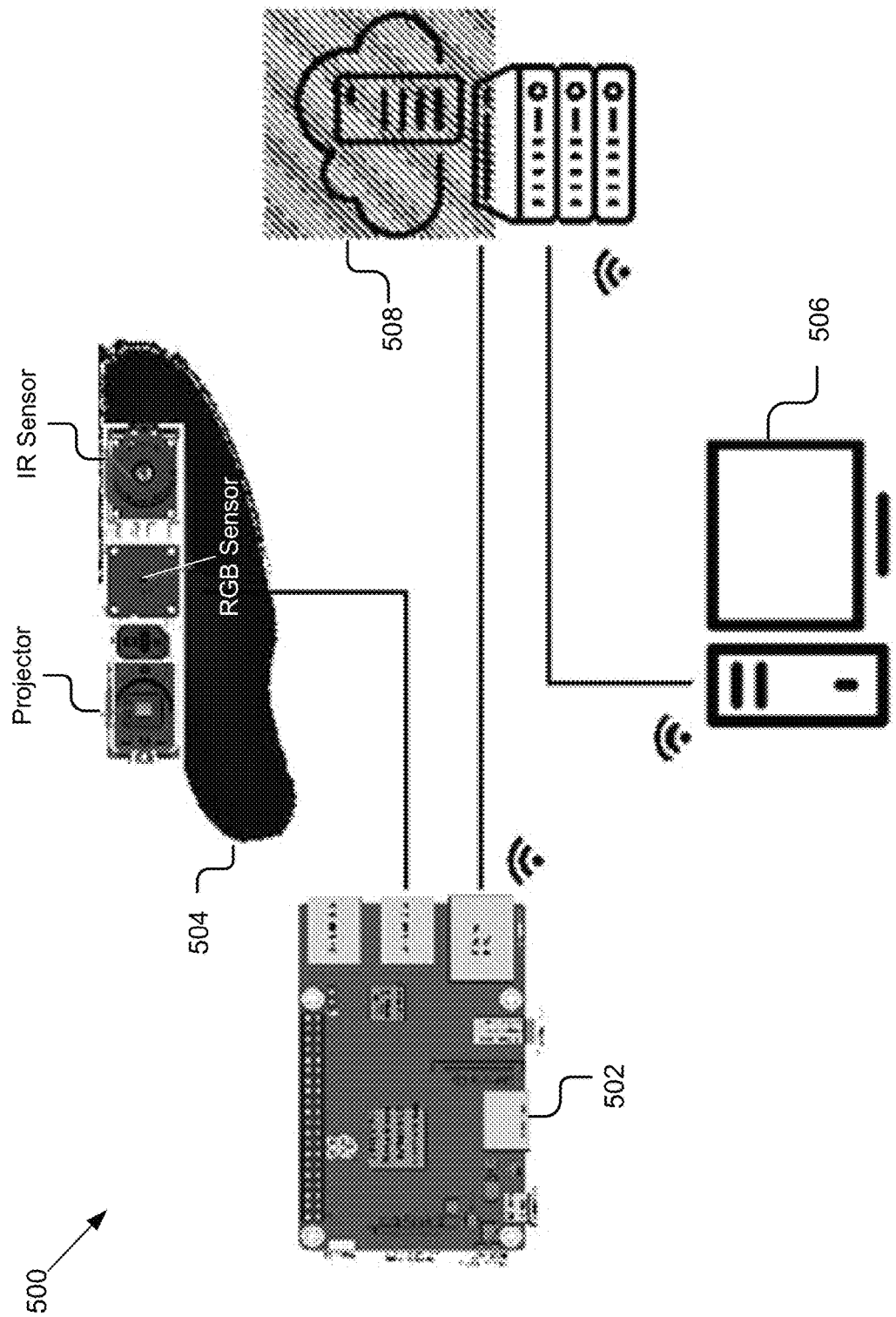
FIG. 5A depicts a block diagram illustrating an example embodiment of hardware implementation for providing video analysis focalized on a salient event.

FIG. 5A depicts a block diagram illustrating one embodiment of hardware implementation 500 for providing video analysis focalized on a salient event. As illustrated in FIG. 5A, a computing device 502 (e.g., a Raspberry Pi3) is connected to a combination capture device 504 (e.g., an Orbbec Astra Mini). Referring back to FIG. 1, the small computing device 502 may be the computing device 101, and the combination capture device 504 may include the capture device 107 and one or more of sensors 113a . . . 113n. The computing device 502 also communicates with the end point, e.g., the local server 506 or the cloud server 508. In some embodiments, the video is captured by an RGB camera, and the depth sensor is formed by an IR projector (which projects a known pattern) and an IR receiver (which captures the pattern deformed by the structure of the scene). Although in the illustrated example, the end point is connected to a single computing device 502. In other examples, the end point may also be connected to multiple computing devices, and therefore receives data from multiple sensors.

Figure 5B:
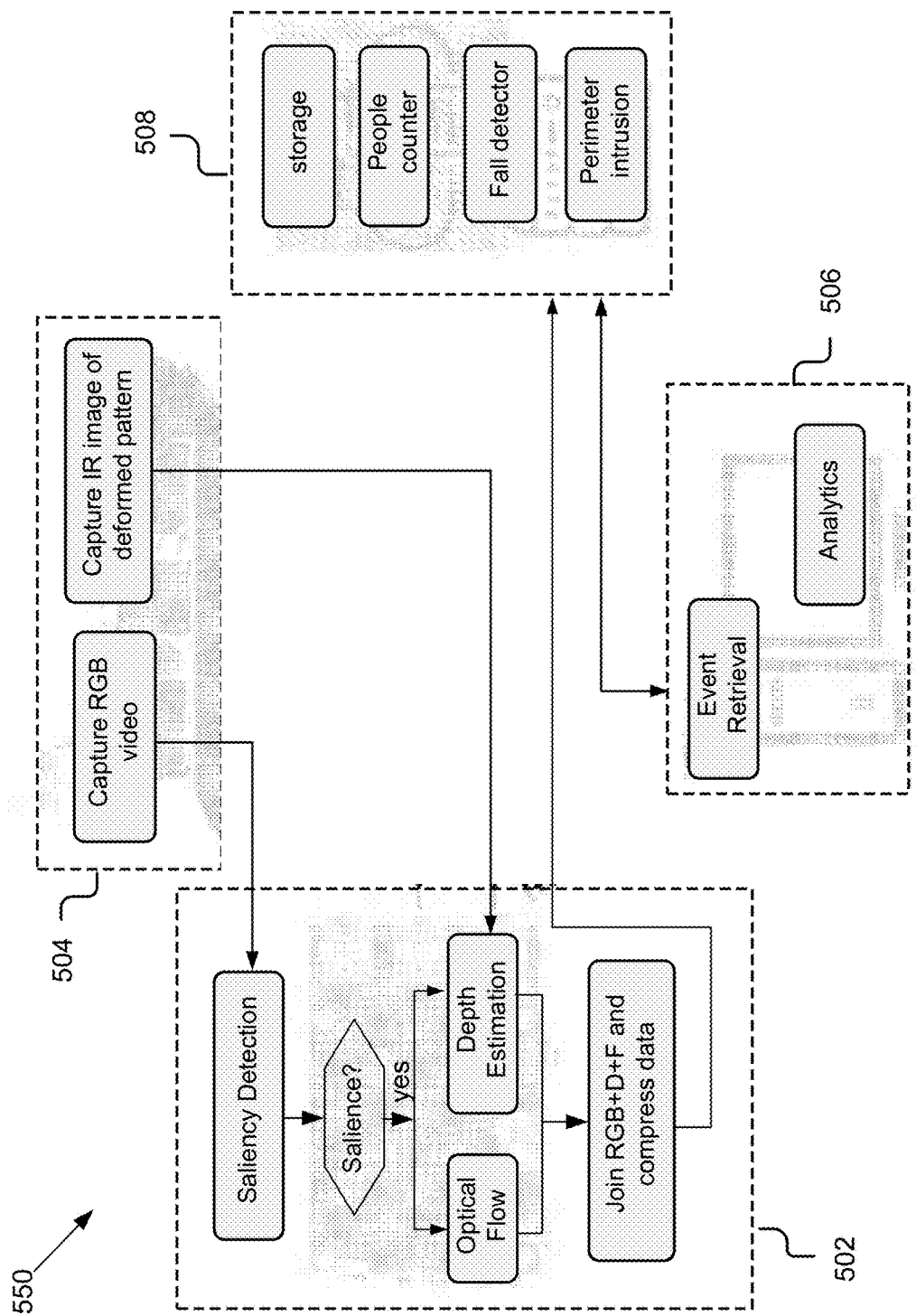
FIG. 5B depicts a block diagram illustrating an example embodiment of an algorithm for providing video analysis focalized on a salient event.

FIG. 5B depicts a block diagram illustrating an example embodiment of algorithm 550 for providing video analysis focalized on a salient event. The low-cost RGB camera embedded in the combination capture device 504 captures a RGB video and sends this video to the computing device 502. The computing device 502 performs saliency detection on the received video data, in particular, identifies a salient event based on the saliency. If a salience condition is satisfied, e.g., a location of the salient event is within an area of interest, the computing device 502 performs optical flow and depth estimation analysis. Since the computing device 502 determines that additional data is may be advantageous to perform the optical flow and depth estimation analysis, a depth sensor embedded in the combination capture device 504 is activated to capture the pattern deformed by the structure of the scene. Based on the analysis, the computing device 502 further combines the data and compresses the data and transmits the data to the cloud server 508.

Typically, the cloud server 508 is used to serve different applications. In some embodiments, the cloud server 508 receives the processed data (e.g., a displacement map, a depth map) from the computing device 502, and runs tasks related to the application. For example, the cloud server 508 may run a people counter task, an occupancy detection task, an area intrusion task, a fall detection task or the like, on the combined data from the computing device 502.

The data analysis as shown in FIGS. 5A and 5B is advantageous because it enables the design of complex video analytics in terms of sub-tasks or sub-analytics, which spreads load over different entities of the system and thus increases throughput of the system.

Figure 6:
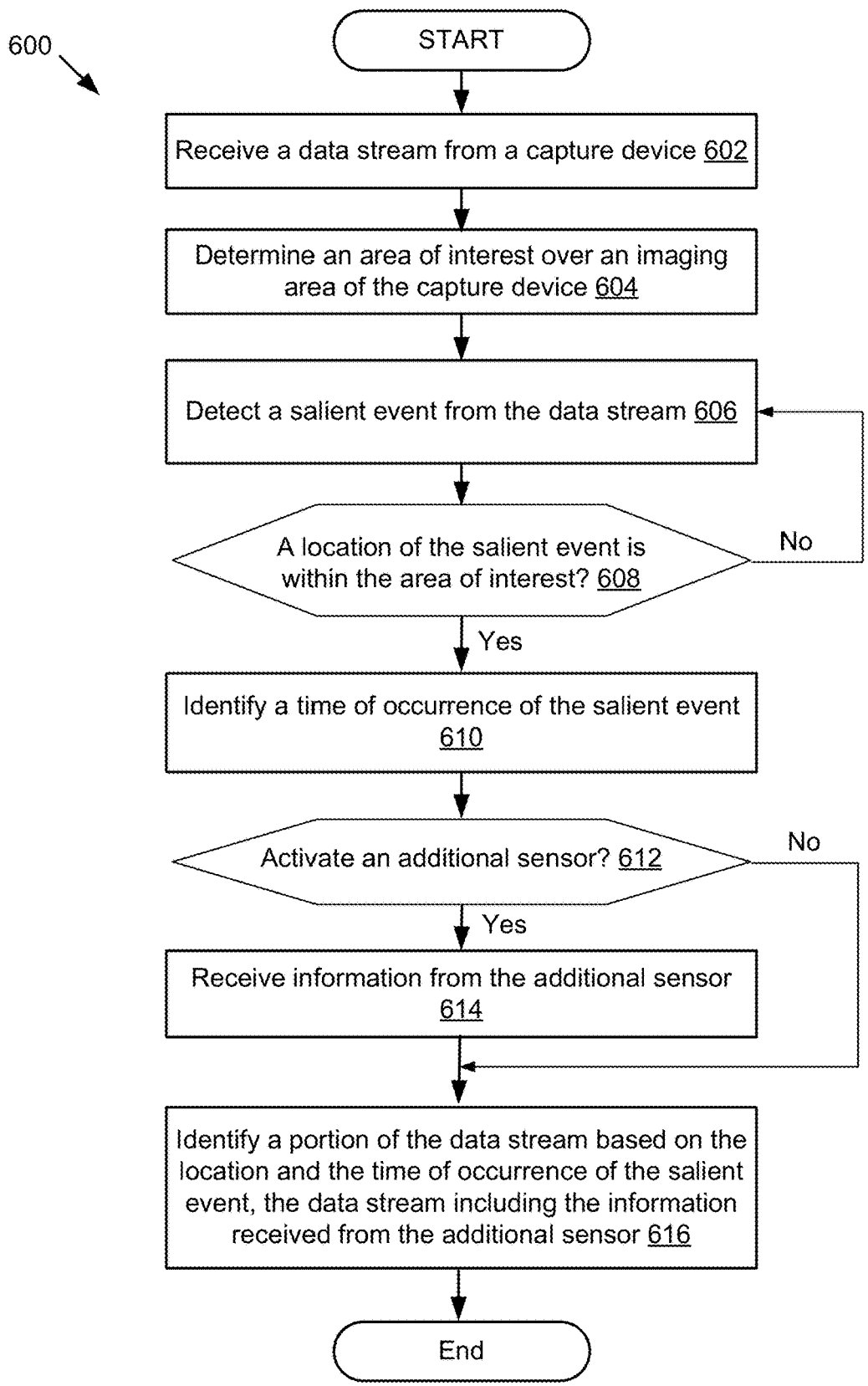
FIG. 6 depicts a flow diagram illustrating an example embodiment of a method for identifying a portion of a data stream focalized on a salient event, on which to perform an action.

FIG. 6 depicts a flow diagram illustrating one embodiment of a method 600 for identifying a portion of a data stream focalized on a salient event, on which to perform an action. As described above, the video processing application 103 of the computing device 101 may include a data receiver 201, an AOI determination module 203, a saliency detector 205, and a data aggregation module 207. At 602, the data receiver 201 receives a data stream from a capture device, e.g., an inexpensive RGB camera capturing a low-resolution video. The data receiver 201 stores the data stream in a buffer which is accessible to the AOI determination module 203 and the saliency detector 205. At 604, the AOI determination module 203 determines an area of interest over an imaging area of the capture device. The imaging area may be, for example, a two-dimensional (2D) field of view showing part of the world that is visible through the capture device located at a particular position and a particular orientation. An area of interest may be a portion of the imaging area that is of interest to a user, for example, an entrance area, a crowded area, etc. In some embodiments, the AOI determination module 203 defines an area of interest in the form of polygon(s) and/or line(s).

At 606, the saliency detector 205 detects a salient event from the data stream. For example, the saliency detector 205 determines a salient event based on detecting changes in the scene such as movement of an object, appearance of the object, disappearance of the object, and a sudden illumination change. At 608, the saliency detector 205 determines whether a location of the salient event is within the area of interest. If the location of the salient event is within the area of interest, at 610, the saliency detector 205 identifies a time of occurrence of the salient event. If the location of the salient event is outside the area of interest, the method 600 steps back to 606 to determine another salient event from the data stream.

In some embodiments, the saliency detector 205 also determines whether additional information is needed after the salient event within the area of interest was determined. At 612, the saliency detector 205 determines whether to activate an additional sensor to obtain the additional information. If yes, the saliency detector 205 signals the data aggregation module 207 to trigger the additional sensor to obtain the additional information. At 614, the data aggregation module 207 receives information from the additional sensor and sends the information to the saliency detector 205. At 616, the saliency detector 205 identifies a portion of the data stream based on the location and the time of occurrence of the salient event, the data stream including the information received from the additional sensor. The additional sensor may be a visual sensor such as a IR camera, a depth sensor. In some embodiments, the saliency detector 205 forwards the identified portion to an appropriate module for performing an action such as optical flow analysis or depth estimation.

Figure 7:
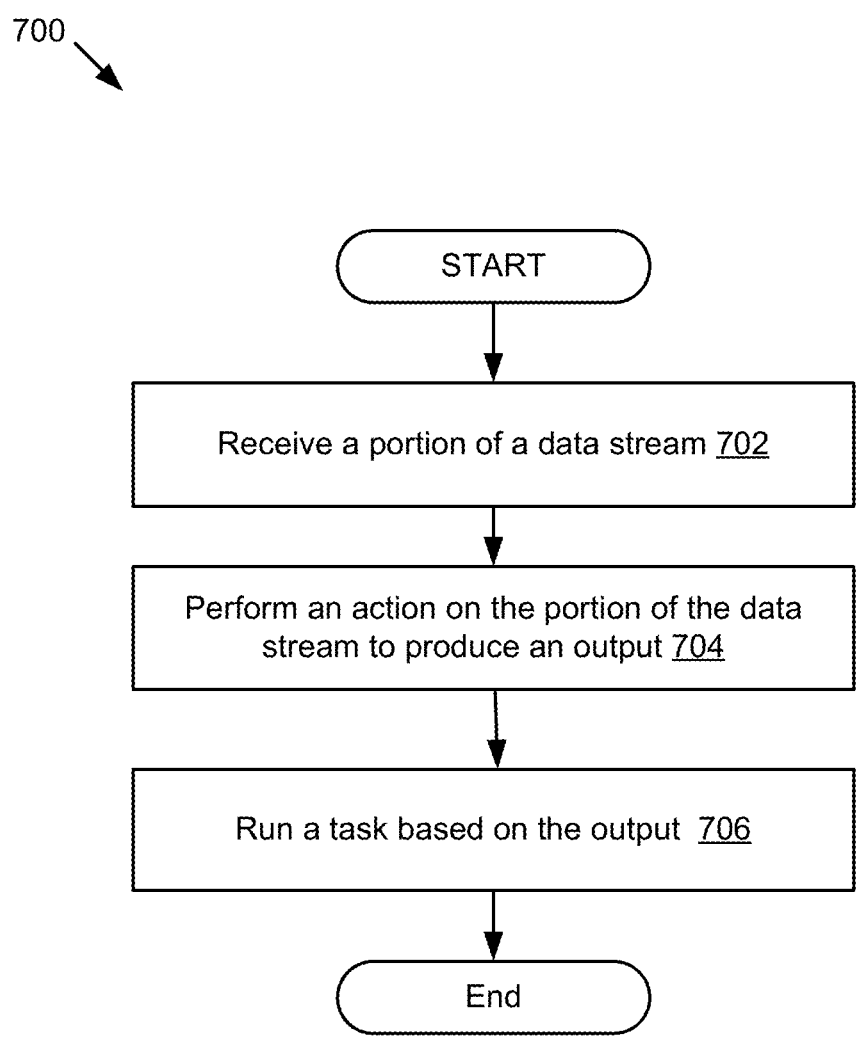
FIG. 7 depicts a flow diagram illustrating an example embodiment of a method for performing an action on a portion of a data stream.

FIG. 7 depicts a flow diagram illustrating one embodiment of a method 700 for performing an action on a portion of a data stream. The method 700 is implemented by a cloud server 121 in communication with a computing device 101. At 702, the cloud server 121 receives a portion of a data stream. For example, the cloud server 121 receives a portion of the data stream identified by the computing device 101 based on a location and a time of occurrence of a salient event. At 704, the cloud server 121 performs an action on the portion of the data stream to produce an output. In some embodiments, performing an action includes performing optical flow analysis on the portion of the data stream. In other embodiments, performing an action includes performing stereo analysis on the portion of the data stream. The output of the action includes at least one of a displacement map, a disparity map, and a depth map. At 706, the cloud server 121 runs a task based on the output, e.g., the collection of the displacement map, the disparity map, and the depth map. The task may be related to people counter, people flow, face detection, tracker, perimeter intrusion, vicinity detector, fall detector, etc.

A system and method for providing visual analysis focalized on a salient event has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the present invention applies to any type of computing system that can receive data and commands, and present information as part of any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. One embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the techniques are not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
receiving a data stream from a capture device;
determining an area of interest over an imaging area of the capture device;
detecting a salient event from the data stream;
identifying a time of occurrence of the salient event in the data stream;
determining whether a location of the detected salient event is within the area of interest; and
in response to the location of the salient event being within the area of interest,
identifying a subset of frames of the data stream based on the time of occurrence of the salient event in the data stream; and
extracting pixels inside a bounding box identified based on the location of the detected salient event from the subset of frames to determine a portion of the data stream on which to perform an action.

2. The computer-implemented method of claim 1, further comprising:
performing saliency detection on the data stream based on movement of an object, appearance of the object, and disappearance of the object; and wherein detecting the salient event is based on the saliency detection.

3. The computer-implemented method of claim 1, wherein to perform the action, the method further comprises:
performing optical flow analysis on the portion of the data stream; and
outputting a displacement map.

4. The computer-implemented method of claim 1, wherein to perform the action, the method further comprises:
performing stereo analysis on the portion of the data stream; and
outputting at least one of a disparity map and a depth map.

5. The computer-implemented method of claim 1, further comprising:
running a task based on an output of the action, wherein the task includes at least one of counting a number of persons accessing the area of interest, asserting presence of a person in the area of interest, and detecting a person falling down in the area of interest.

6. The computer-implemented method of claim 1, further comprising activating an additional sensor in response to the location of the salient event being within the area of interest.

7. The computer-implemented method of claim 1, wherein the area of interest is defined by a line or a polygon.

8. The computer-implemented method of claim 1, wherein the capture device is at least one of a conventional capture device, a smart capture device, a thermal capture device, and an infrared sensor, and wherein the data stream includes at least one of radiance measurements, luminance measurements, chrominance measurements, and temperature measurements.

9. A system comprising:
one or more processors; and
a memory, the memory storing instructions, which when executed cause the one or more processors to:
receive a data stream from a capture device;
determine an area of interest over an imaging area of the capture device;
detect a salient event from the data stream;
identify a time of occurrence of the salient event in the data stream;
determine whether a location of the detected salient event is within the area of interest; and
in response to the location of the salient event being within the area of interest,
identify a subset of frames of the data stream based on the time of occurrence of the salient event in the data stream; and
extract pixels inside a bounding box identified based on the location of the detected salient event from the subset of frames to determine a portion of the data stream on which to perform an action.

10. The system of claim 9, wherein the instructions further cause the one or more processors to:
perform saliency detection on the data stream based on movement of an object, appearance of the object, and disappearance of the object;
and wherein detecting the salient event is based on the saliency detection.

11. The system of claim 9, wherein to perform the action, the instructions further cause the one or more processors to:
perform optical flow analysis on the portion of the data stream; and
output a displacement map.

12. The system of claim 9, wherein to perform the action, the instructions further cause the one or more processors to:
perform stereo analysis on the portion of the data stream; and
output at least one of a disparity map and a depth map.

13. The system of claim 9, wherein the instructions further cause the one or more processors to:
run a task based on an output of the action, wherein the task includes at least one of counting a number of persons accessing the area of interest, asserting presence of a person in the area of interest, and detecting a person falling down in the area of interest.

14. The system of claim 9, wherein the instructions cause the one or more processors to activate an additional sensor in response to the location of the salient event being within the area of interest.

15. The system of claim 9, wherein the area of interest is defined by a line or a polygon.

16. A computer program product comprising a non-transitory computer readable medium storing a computer readable program, wherein the computer readable program when executed causes a computer to:
receive a data stream from a capture device;
determine an area of interest over an imaging area of the capture device;
detect a salient event from the data stream;
identify a time of occurrence of the salient event in the data stream;
determine whether a location of the detected salient event is within the area of interest; and
in response to the location of the salient event being within the area of interest,
identify a subset of frames of the data stream based on the time of occurrence of the salient event in the data stream; and
extract pixels inside a bounding box identified based on the location of the detected salient event from the subset of frames to determine a portion of the data stream on which to perform an action.

17. The computer program product of claim 16, wherein the computer readable program causes the computer to:

perform saliency detection on the data stream based on movement of an object, appearance of the object, and disappearance of the object; and wherein detecting the salient event is based on the saliency detection.

18. The computer program product of claim 16, wherein to perform the action, the computer readable program causes the computer to:

perform optical flow analysis on the portion of the data stream; and output a displacement map.

19. The computer program product of claim 16, wherein to perform the action, the computer readable program causes the computer to:

perform stereo analysis on the portion of the data stream; and output at least one of a disparity map and a depth map.

20. The computer program product of claim 16, wherein the computer readable program causes the computer to:

run a task based on an output of the action, wherein the task includes at least one of counting a number of persons accessing the area of interest, asserting presence of a person in the area of interest, and detecting a person falling down in the area of interest.

* * * * *